United States Patent
Becker

(10) Patent No.: US 7,302,301 B2
(45) Date of Patent: *Nov. 27, 2007

(54) METHOD FOR MONITORING AN AUTOMATION SYSTEM

(75) Inventor: Peter Becker, Gaggenau (DE)

(73) Assignee: Siemens Aktiengesellschaft, Munich (DE)

( * ) Notice: Subject to any disclaimer, the term of this patent is extended or adjusted under 35 U.S.C. 154(b) by 471 days.

This patent is subject to a terminal disclaimer.

(21) Appl. No.: 10/943,962

(22) Filed: Sep. 20, 2004

(65) Prior Publication Data

US 2005/0125567 A1 Jun. 9, 2005

Related U.S. Application Data

(63) Continuation of application No. PCT/DE03/00908, filed on Mar. 19, 2003.

(30) Foreign Application Priority Data

Mar. 19, 2002 (DE) ................. 102 12 131

(51) Int. Cl.
*G05B 11/01* (2006.01)
*G06F 11/00* (2006.01)
*G06F 3/00* (2006.01)
*G05B 15/00* (2006.01)
*G05B 19/42* (2006.01)

(52) U.S. Cl. .................. 700/12; 700/11; 700/13; 702/188; 710/1; 340/825; 340/825.07

(58) Field of Classification Search .......... 700/12, 700/11–13; 702/188; 340/825.07
See application file for complete search history.

(56) References Cited

U.S. PATENT DOCUMENTS

| 5,128,855 A | * | 7/1992 | Hilber et al. ................. 700/3 |
| 5,349,523 A | * | 9/1994 | Inou et al. .................. 363/97 |
| 5,377,309 A | * | 12/1994 | Sonobe et al. .............. 706/60 |
| 5,469,150 A | | 11/1995 | Sitte |
| 5,515,035 A | * | 5/1996 | Gut ........................... 370/445 |
| 5,691,714 A | | 11/1997 | Mehnert et al. |

(Continued)

FOREIGN PATENT DOCUMENTS

DE 32 40 046 A1 5/1983

(Continued)

*Primary Examiner*—Anthony Knight
*Assistant Examiner*—Sunray Chang
(74) *Attorney, Agent, or Firm*—Sughrue Mion Pllc.

(57) ABSTRACT

A method and a system for monitoring and determining preceding states of at least one terminal of an automation system are provided. The automation system includes one or more terminals (1, 2), each of which can assume two or more states and each of which outputs a monitoring message that depends on the two or more states, and a control unit (3) that reads in the monitoring message from the one or more terminals (1, 2). Each of the one or more terminals (1, 2) outputs another monitoring message only after it has received an acknowledgment signal (Q) from the control unit (3). In order to be able, even subsequently, to reconstruct at least some of the preceding state changes, the monitoring message contains, in addition to each state value, at least one additional component (S1_Z, S2_Z; S1_OV, S2_OV) whose value is changed during a transition of the state value and which is reset to an initial value when a monitoring message is output.

18 Claims, 5 Drawing Sheets

U.S. PATENT DOCUMENTS

| | | | |
|---|---|---|---|
| 5,765,000 A * | 6/1998 | Mitchell et al. | 710/266 |
| 5,980,078 A * | 11/1999 | Krivoshein et al. | 700/1 |
| 6,016,523 A * | 1/2000 | Zimmerman et al. | 710/63 |
| 6,826,433 B1 * | 11/2004 | Barthel et al. | 700/79 |
| 6,895,369 B2 * | 5/2005 | Becker | 702/188 |

FOREIGN PATENT DOCUMENTS

| | | |
|---|---|---|
| WO | WO 03/027984 A2 | 4/2003 |
| WO | WO 03/027984 A3 | 4/2003 |

* cited by examiner

METHOD FOR MONITORING AN AUTOMATION SYSTEM

This is a Continuation of International Application PCT/DE03/00908, with an international filing date of Mar. 19, 2003, which was published under PCT Article 21(2) in German, and the disclosure of which is incorporated into this application by reference.

FIELD AND BACKGROUND OF THE INVENTION

1. Field of the Invention

The present invention relates to a method for monitoring an automation system with a control unit and a plurality of terminals. In particular, the present invention relates to the reliable detection of a plurality of signal changes in a monitoring message between a terminal and a control unit in an automation system by monitoring and determining preceding states of one or more terminals of an automation system.

2. Description of Related Art

In automation systems with a plurality of terminals (also referred to as programmable controllers) and control units (also referred to as control and monitoring stations or operator stations) events are mapped to binary signals. The terminals detect signal changes (level-triggered changes) and use a monitoring message to report them to one or more control units. The control unit processes the reported signal level.

In the prior art, when a first message reporting a signal change is sent from the terminal, a second message cannot be sent until the control unit has confirmed that it has received the first message. The contents of the second message, for example, can indicate that the signal has changed again. The control unit confirms the receipt of a message by sending an acknowledgment message, for example.

If a single signal is reported in a monitoring message, the last two signal changes may be detected in the prior art systems. The last two signal changes may be detected by:

a) providing additional "overflow" information in the monitoring message indicating that one or more signal changes could not be reported; b) receiving a message with the identical signal state as the signal, stored in the control unit, indicating the last current state detected by the terminal.

To increase the capacity of the event log and to use system resources more effectively, monitoring messages which contain more than one signal, e.g., eight signals, are used. The additional information in the form of overflow flags in the monitoring message and the fact that a message has been received represents a 1:n relation if there is a number of signals. An allocation of the additional information in the overflow flag and of the event "receipt of a monitoring message" to a single signal or several signals is no longer possible. It is therefore useless for general signal tracing. The information available in the monitoring message is reduced instead to the respective signal state; a change in the meantime from the initial to a second state and back again is not detected.

In other words, conventional techniques cannot provide the control unit with accurate state changes of a signal detected by a terminal. The control unit cannot receive accurate state changes of the signal at least in part because of the undetected state changes that occur during the transmission of the monitoring message from the terminal to the control unit. That is, when more than one state change of the signal occurs during the transmission of the monitoring message, these intermediate state changes are not reported to the control unit. Instead, these intermediate state changes are unnoticed by the control unit.

OBJECTS OF THE INVENTION

Thus, one object of the present invention is to provide a method with which at least some of the preceding state changes can be even subsequently reconstructed.

Illustrative, non-limiting embodiments of the present invention may overcome the above disadvantages and other disadvantages not described above. The present invention is not necessarily required to overcome any of the disadvantages described above, and the illustrative, non-limiting embodiments of the present invention may not overcome any of the problems described above. The appended claims should be consulted to ascertain the true scope of the invention.

SUMMARY OF THE INVENTION

According to exemplary, non-limiting embodiments of the present invention, a method and a system for monitoring and determining preceding states of one or more terminals of an automation system are provided. According to one formulation, the method and the system include one or more terminals, each of which is configured to assume two or more states and each of which is configured to output a monitoring message that depends on these states. In addition, the method and the system include a control unit configured to read in the monitoring message from each of the terminals. Each of the terminals outputs a subsequent monitoring message only after receiving an acknowledgment message from the control unit. In addition, the monitoring message includes a state component, and one or more additional component. The value of the one or more additional components changes when a transition of the state of the terminal occurs. Each of the additional components is reset to an initial value when a monitoring message is output to the control unit.

According to exemplary, non-limiting embodiments of the present invention, another system for monitoring and determining preceding states of one or more terminals of an automation system is provided. In this system, each of the terminals assumes two or more states and outputs a monitoring message, which has a state component and one or more additional components. The value of the state component and the value of each of the one or more additional components depend on the two or more states of the one or more terminals. In addition, the system includes a control unit reading in the monitoring message from each of the terminals. Each of the terminals outputs a subsequent monitoring message only after receiving an acknowledgment message from the control unit. In this system, the value of the one or more additional components changes when a transition of the state occurs and the previous transition of the state of the terminal is already buffered in the state component. Each of the additional components is reset to an initial value when a monitoring message is output to the control unit.

According to exemplary, non-limiting embodiments of the present invention, another system for monitoring and determining preceding states of one or more terminals of an automation system is provided. In this system, each of the terminals assumes two or more states and outputs a monitoring message, which has a state component and one or more additional components. The value of the state component and the value of each of the one or more additional components depend on the two or more states of the one or more terminals. In addition, the system includes a control unit reading in the monitoring message from each of the terminals. Each of the terminals outputs a subsequent monitoring message only after receiving an acknowledgment message from the control unit. In this system, each of the additional components is a counter of four or more values. The value of the counter is incremented when a transition of the state of the terminal occurs. The counter is reset to an initial state when a monitoring message is output to the control unit.

In the exemplary, non-limiting embodiments of the present invention, the one or more additional component may form a counter of four or more values, which, after reaching a maximum value, preferably counts down by ones and, similarly, counts up by ones in alternating fashion.

In the exemplary, non-limiting embodiments of the present invention, the monitoring message may contain one or more state components whose value corresponds to the states of the one or more terminals. The value of the one or more additional components is changed, in addition to each value of the state component, if the value of the state component changes more than twice before the monitoring message is output by the terminal.

In the exemplary, non-limiting embodiments of the present invention, all the state components and the additional components of the monitoring message may be in a binary form.

According to the exemplary, non-limiting embodiments of the present invention, the monitoring message is expanded to indicate to the control unit, if necessary, that in addition to the transitions indicated in the monitoring message a further transition has occurred. In order to be able to indicate in the monitoring message that a further transition has occurred, an additional information unit is provided for each signal. For example, based on a comparison of the preceding and the current state of the terminal, it is possible to infer additional transitions that previously occurred or to carry out a validity check of the information transmitted by the monitoring message.

BRIEF DESCRIPTION OF THE DRAWINGS

The present invention will now be described in detail by describing illustrative, non-limiting embodiments thereof with reference to the accompanying drawings. In the drawings, the same reference characters denote the same elements.

DETAILED DESCRIPTION OF THE PREFERRED EMBODIMENTS

Figure 1:
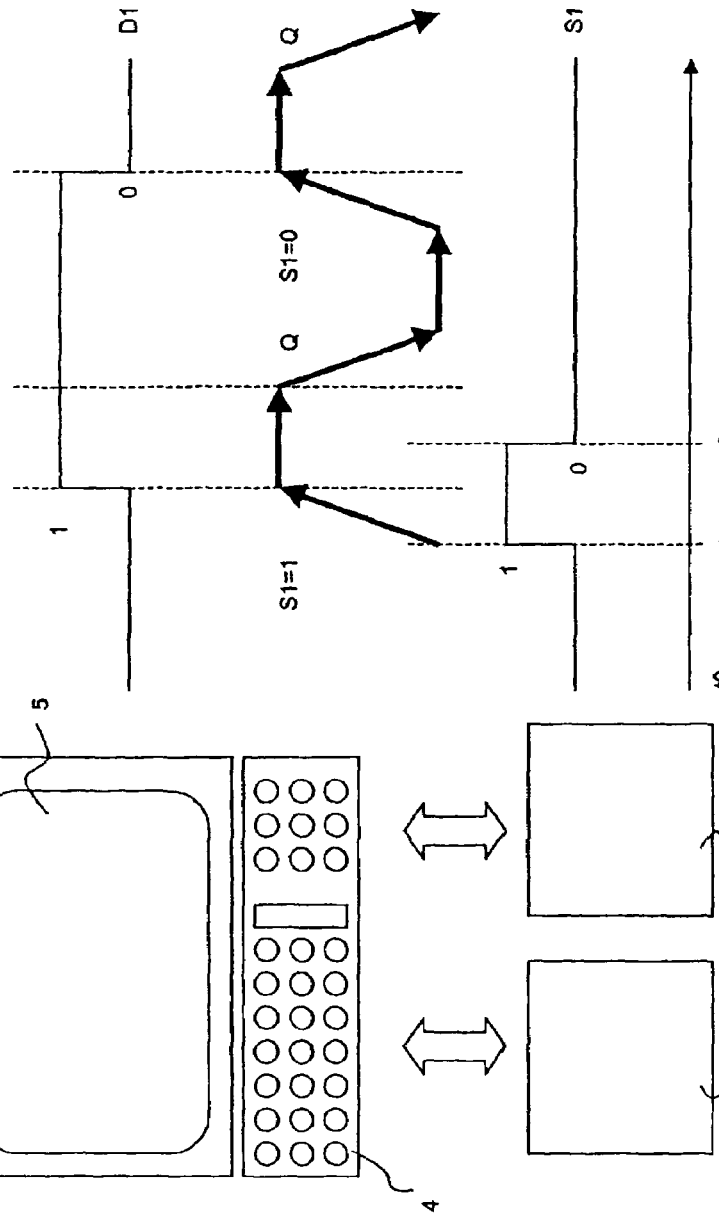
FIG. 1 shows the sequence of a state change and the associated representation for a state transition according to the conventional techniques.

The present invention will now be described in detail by describing illustrative, non-limiting embodiments thereof with reference to the accompanying drawings. In the drawings, the same reference characters denote the same elements.

FIG. 1 shows an automation system with two terminals 1 and 2 and a control unit 3. The control unit 3 has an input keyboard 4 and a screen 5 for displaying signals and state indications of the terminals 1 and 2 connected therewith and additional terminals (not depicted) depending on the size of the automation system.

Each of the terminals 1 and 2, which as a rule carry out specific tasks in the automation system, can assume at least two different states, or state values. These states, or state values, are transmitted to the control unit 3 as a state indication (state values or a value of the state) or as a communication of a transition between states. Communication between the terminal 1 or 2 and the control unit 3 is illustrated in FIGS. 1-5 by double arrows. The control unit 3 reads in the different asynchronous messages of the separate terminals such that the personnel monitoring the installation has an overview of the overall state of the installation and can intervene to make adjustments using the control unit 3. The term "reads in" or "reading in," encompasses the control unit detecting, recording and/or processing messages of the terminals without these messages necessarily having to be first called up by the control unit from the respective terminal, although such a call-up is not excluded from this term.

The control unit should always display the current state of the terminal—after a time delay—and furthermore detect at least the last transition cycle of the terminal (e.g., "0"→"1"; "1"→"0" or "1"→"0"; "0"→"1"). In certain application cases, this latter aspect, namely detecting the last transition cycle, is particularly important: for state messages (so-called "events") it is important to determine whether an event has occurred, e.g., whether a butterfly valve in the installation was opened and closed again. How often this occurs is of secondary importance. The frequency of the occurrence, if necessary, is recorded in the terminal and is then available as additional information.

FIG. 1, on the right, shows the sequence of several state changes of the terminal 1, the content of messages exchanged between the terminal 1 and the control unit 3, and the associated representation in the control unit 3 according to the conventional techniques.

At an instant t0, the terminal is in a logic state denoted by "0". This state "0" can be present, for example, when the automation system is started up or this state "0" can be reached at a later point. In the first case when the automation system is started up, the control unit 3 does not know the state of the terminal 1. The initial state is detected by the control unit 3 only when the terminal 1 communicates a state change to the control unit 3.

At an instant t1, there is a transition of the terminal 1 from a logic state "0" to a logic state "1." This transition from the logic state "0" to the logic state "1" triggers the output of a monitoring message by the terminal 1. The monitoring message includes a state component S1, which is an identical image of the state of the terminal 1 e.g., "1". For the sake of simplicity, in this exemplary system, a signal can assume only two state s defined by states "0" and "1", but the invention is not limited thereto, and the state component S1 can generally assume a plurality of values. The control unit 3 reads in the monitoring message. This read in occurs over a defined period of time and is illustrated in FIG. 1 by a diagonal arrow from a lower to an upper level in a portion of the interval between the instant t1 and t2. Next to the arrow, FIG. 1 further illustrates the content of the monitoring message. In this particular example, the content of the monitoring message consists only of the status component S1 whose content is "1," i.e., the new state value that the terminal 1 has now assumed. The reading-in is terminated at an instant after t1 but before the instant t2.

When the control unit 3 has finished reading-in the monitoring message, a signal D1, which corresponds to a representation of the state S1 of the terminal 1, is reset in the control unit 3 from a logic state "0" to a logic state "1." For the sake of simplicity, in this example as well as in exemplary non-limiting embodiments of the present invention, a state transition of the terminal in one direction corresponds to a transition of the signal D1 in the same direction. This correspondence between the state transition of the terminal and the value of the signal D1 is not a prerequisite for implementing the present invention, however, and a person skilled in the art will know that the relationship between state values of the state component S1 and the representation signal D1 can also be selected to be complementary.

After the monitoring message has been completely transmitted from the terminal 1 to the control unit 3, additional processing steps are carried out in the control unit 3. The horizontal arrow at the upper level in FIG. 1 illustrates the duration of the processing steps, which begin before the instant t2 and ends after the instant t2. Only after the processing steps have been completed does the control unit 3 transmit an acknowledgment signal to the sending terminal 1, with which it informs the terminal 1 that the monitoring message of the terminal 1 has been read in successfully by the control unit 3. The transmission of the acknowledgement signal also takes a specific period of time. In FIG. 1, the transmission of the acknowledgement signal is illustrated by a diagonal arrow Q from the upper level to the lower level. A horizontal arrow, illustrated in FIG. 1, on the lower level indicates the subsequent standby state of the communication between the terminal 1 and the control unit 3. During this time, the standby state, the terminal 1 processes the acknowledgement message received from the control unit 3.

Only after the terminal 1 processes the acknowledgement message, can it send a message to the control unit 3 indicating that a further transition has taken place. In the illustrated example, such a transition occurred at the instant t2, shortly after the first message was sent by the terminal 1 to the control unit 3. During the transition at the instant t2, the communication between the terminal 1 and the control unit 3 and the processing within the terminal 1 or the control unit 3 has taken place. The second state transition from logic "1" to logic "0" has therefore been buffered by the terminal 1 and is only being sent to the control unit 3 after the processing of the acknowledgement message by the terminal 1. Only when the control unit 3 reads in this subsequent monitoring message, the representation signal D1 is set to "0." As a result, the representation signal D1 inaccurately represents the state component S1. In other words, the control unit 3 misses the transition, which occurred at instant t2.

Figure 2:
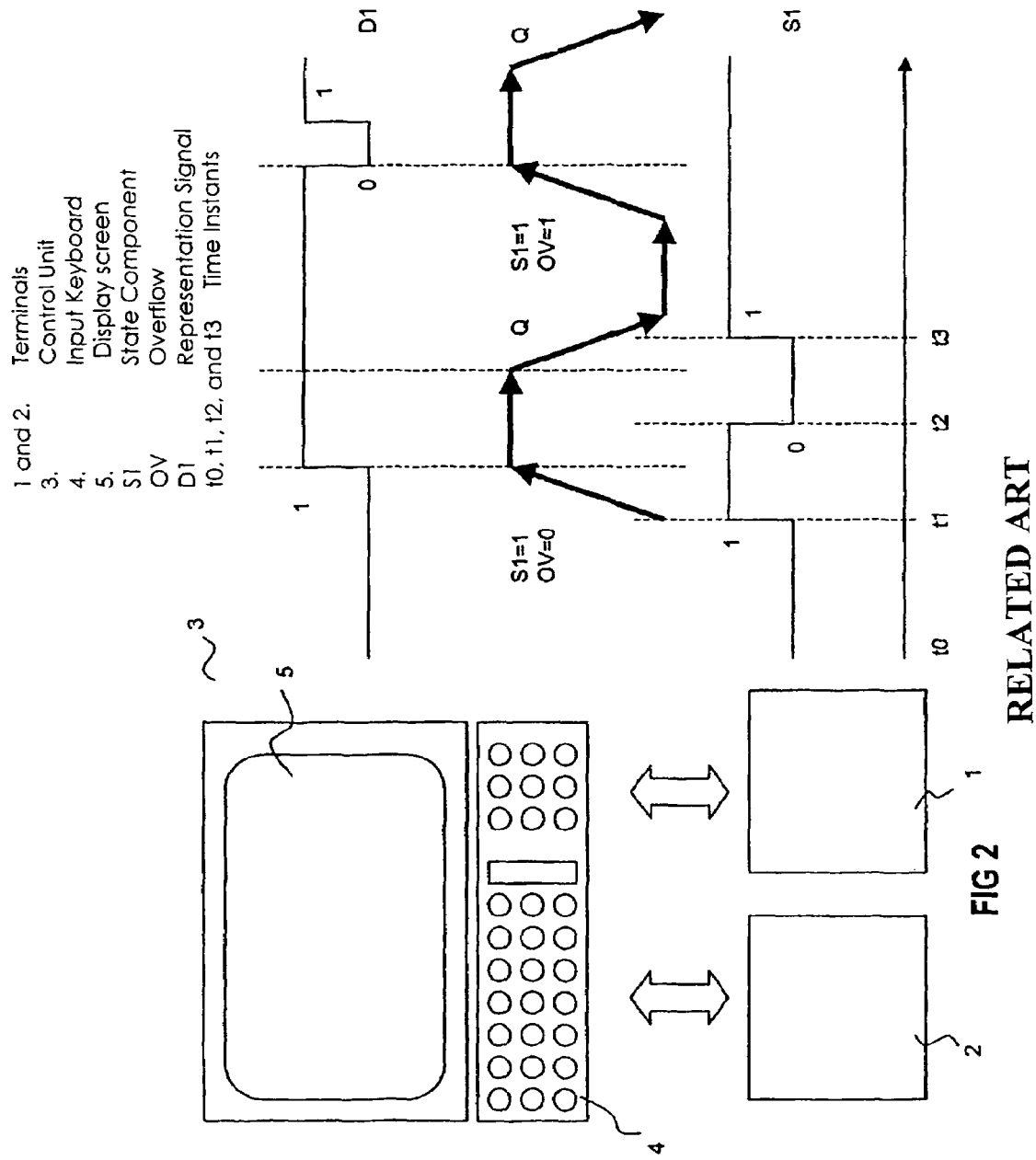
FIG. 2 shows the sequence of a state change and the associated representation for several state transitions according to the conventional techniques.

FIG. 2 shows an expanded monitoring message, which enables communication between the terminal 1 and the control unit 3 at a higher rate of state changes of the terminal 1. If the signals change rapidly, the message load can become very high. This high message load burdens the automation system, and substantially limits the system's communication capacity. To prevent this high message load, the conventional techniques introduced a method called "acknowledgment-triggered signaling" (commonly referred to as "QTM"), which can be used to influence messages interactively. The terminal signals a message only if the control unit has cleared this signal by means of a message. If a signal in the terminal has been cleared, the terminal reports a signal change and deletes the clearance in the terminal. Other signal changes can no longer be reported because of the deleted clearance. If a signal change is lost, this signal can no longer be cleared. To exclude this deadlock it is absolutely necessary to detect at least the last two signal changes.

To detect at least the last two signal changes, in the method depicted in FIG. 2, an additional component is included in the monitoring message, which is referred to as OV (overflow). In addition to the transitions of the terminal 1 from "0" to "1" at t1 and from "1" to "0" at t2 shown in FIG. 1, a further transition from "0" to "1" occurs at an instant t3. The transition from "1" to "0" at t2 cannot be immediately reported by the terminal 1 to the control unit 3 for the above-described reasons and would therefore be lost because at the instant when the terminal 1 can send another message to the control unit 3 its state is again "1". The state "1" of the terminal 1 thus corresponds to the last reported state, and the control unit 3 would not detect a—previously completed—state transition of the terminal 1.

To document the previously completed transition, the component OV is set to "1" in the next monitoring message, which indicates to the control unit 3 that another "hidden" transition has taken place in addition to the reported transition. When the second monitoring message is received which reports the transition from "1" to "0" of the terminal 1, the representation signal is therefore reset from "1" to "0." However, because the component OV of the monitoring message is furthermore set to "1," the representation signal D1 is immediately reset to "1" to account for the "hidden" transition. The resulting representation signal D1 is shown at the top right of FIG. 2.

Figure 3:
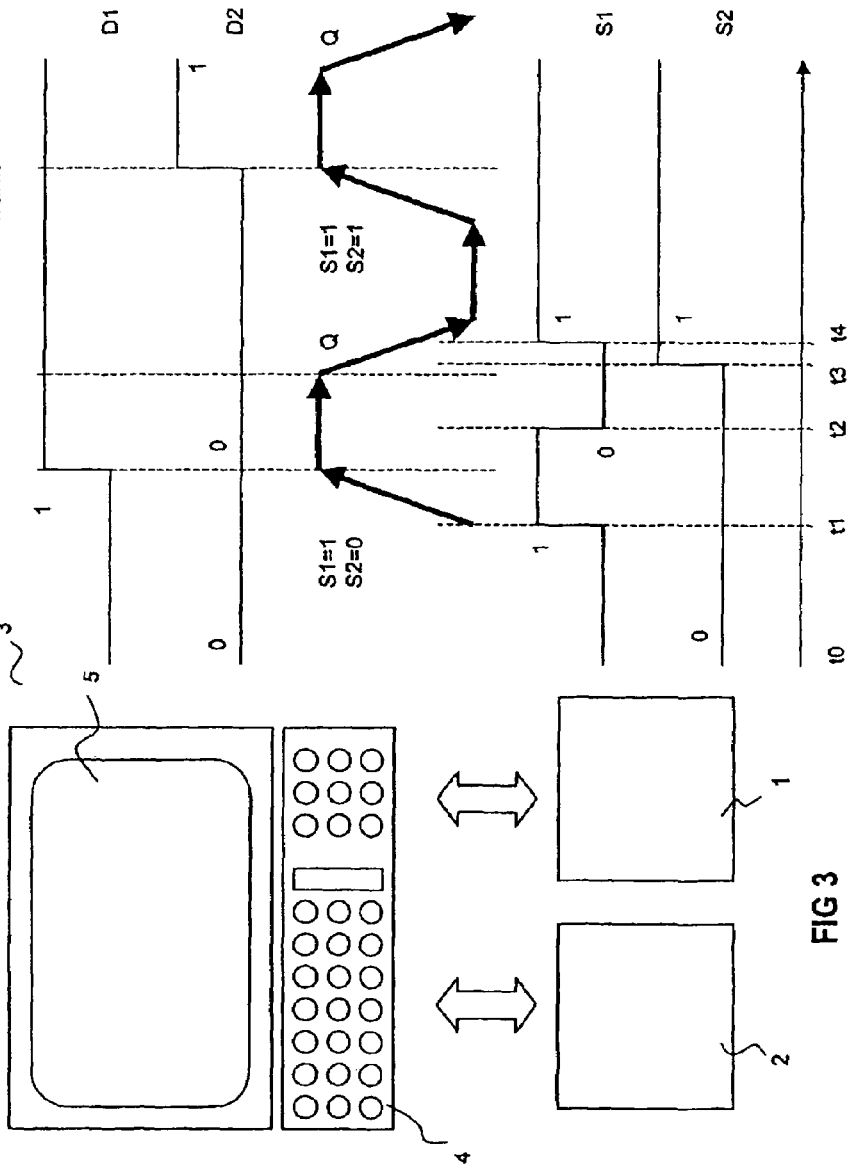
FIG. 3 shows the sequence of a state change and the associated representation for several monitoring messages and several state transitions according to the conventional techniques.

As shown in FIG. 3, this information is not sufficient if the terminal 1 can assume a plurality of states and more than one state component must therefore be reported to the control unit 3. FIG. 3 shows an example with a state component S1 and an additional component S2 of the monitoring message.

In the example shown in FIG. 3, the sequence of state value transitions of the state component S1 is the same as in FIG. 2. In other words, there is a first state value transition from "0" to "1" at t1, a second state value transition from "1" to "0" at t2 and a third state value transition from "0" to "1" occurring at an instant t4, as opposed to an instant t3 as in the previous examples. In addition, there is a state value transition of a second state component S2 from "0" to "1" at an instant t3 occurring between the instants t2 and t4. The first monitoring message which the terminal 1 transmits to the control unit 3 at t1, therefore, contains the values "1" and "0" for the components S1 and S2, respectively. The second monitoring message which the terminal 1 transmits to the control unit 3 after the instant t4 contains the values "1" and "1" for the components S1 and S2, respectively, because both S1 and S2 have assumed the value "1" after this instant t4. As illustrated in FIG. 3 with the resulting representation signal D1, the system therefore loses the "hidden" transition of S1 at instants t2 and t4. This loss occurs even with the additional component OV of the monitoring message because the system could no longer uniquely allocate this component OV to one of the state values S1 and S2.

In short, there is a need in the art to prevent such losses.

Figure 4:
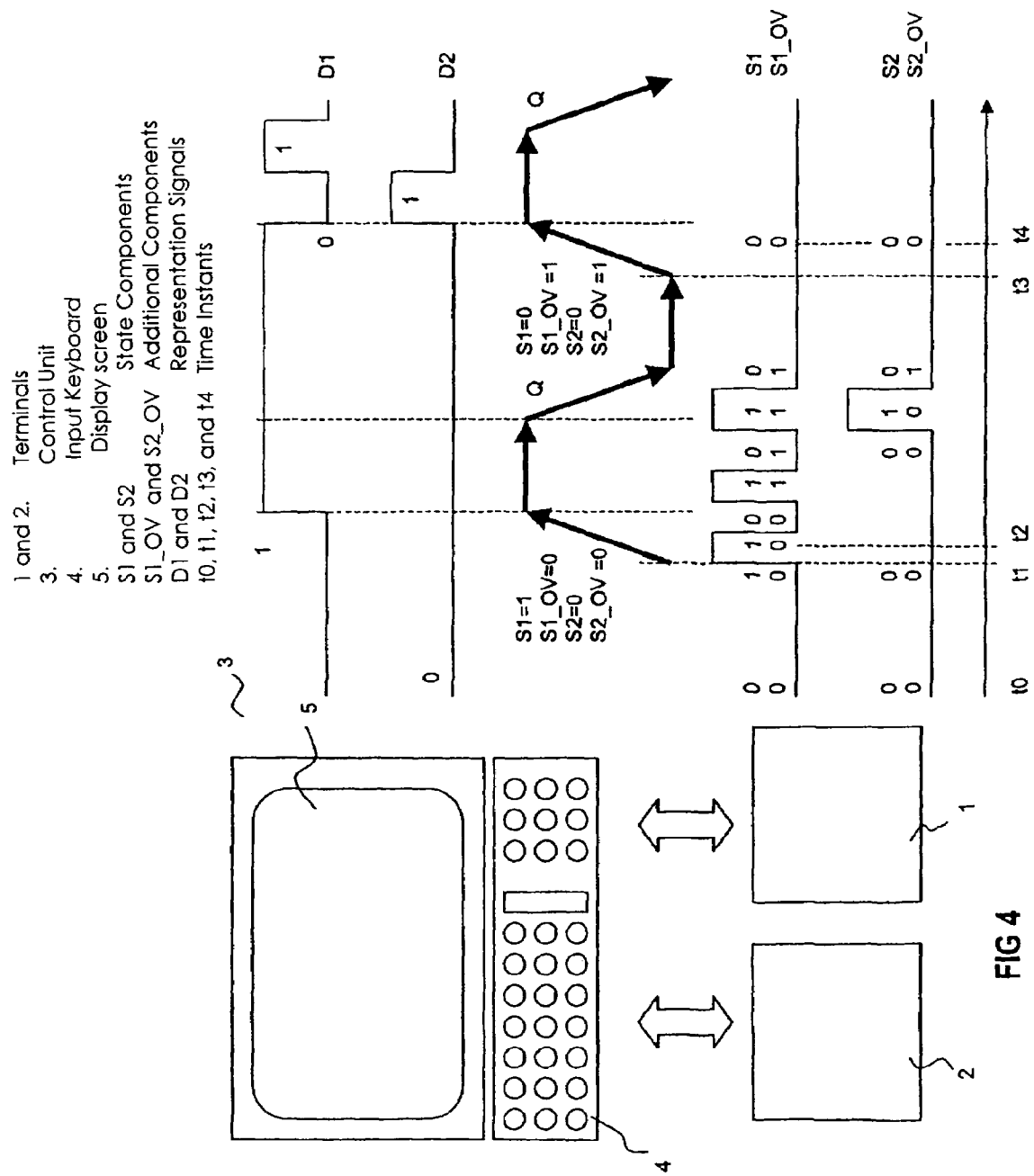
FIG. 4 shows the sequence of state changes and the associated representation for several monitoring messages and several state transitions according to a first illustrative, non-limiting embodiment of the present invention.

FIG. 4 shows a first exemplary, non-limiting embodiment of the present invention. In this exemplary embodiment, for each signal of a message, an additional information unit S1_OV and/or S2_OV is introduced. This information unit changes from "0" to "1," if the associated signal changes its state more than once before the signal state can be reported to the control unit 3. Based on the reported current signal state and the additional information Sn_OV, the control unit 3 can retrace every signal of the message in the terminal 1 or 2 at least two signal changes that previously occurred.

FIG. 4 shows an exemplary, non-limiting embodiment for reliably detecting state changes by expanding the monitoring message if there are several possible states of the terminal in QTM methods. In principle, a further information unit is necessary for each reported signal, which is treated as binary information below, although multivalue information units and, in particular, analog signals can also be used.

In FIG. 4, each signal is assigned the additional components S1_OV and/or S2_OV. When a state transition occurs it is recorded in the corresponding additional component S1_OV or S2_OV. The components S1, S1_OV, S2, S2_OV . . . are listed at the bottom right of FIG. 4. When the message is transmitted after the instant t1, this event information is deleted. The subsequent events at t2 and thereafter are collected and reported to the control unit when the acknowledgment signal Q is received. The control unit can use the received signal state S1 and the additional component S1_OV to reconstruct the signal shape of the last two signal changes.

Thus, in FIG. 4, the components S1 and S1_OV of the first state, like the components S2 and S2_OV of the second state of the terminal 1 are set to "0" at the instant t0. At the instant t1, the state value of S1 changes from "0" to "1," such that S1 assumes the value "1" while all the other variables retain the value "0."

The monitoring message is transmitted at the instant t2 and, in the exemplary embodiment shown in FIG. 4, the additional component S1_OV is simultaneously reset to "0" because a message has been transmitted from the terminal 1 to the control unit 3 and the information no longer needs to be buffered in the terminal 1. In the sequence depicted in FIG. 4, a transition of S1 from "1" to "0" occurs after the instant t2. The values of S1 and S1_OV are consequently "0" and "0." Since the terminal 1 cannot immediately report this transition to the control unit 3, these values are buffered in the state component S1 and since this is a first value being buffered into the state component S1, the additional component S1_OV remains "0." At the next transition of S1 from "0" to "1" S1 is set to "1." In addition, S1_OV is set to "1" because the last transition has not yet been reported, or the terminal 1 has not yet received an acknowledgment.

The state S1_OV=1 persists until the terminal 1 has transmitted a message to the control unit 3. A subsequent transition resets S1 to "0," and another transition following thereafter resets S1 to "1," etc. Finally, in the situation depicted, S1 is reset to "0" even before a further message is transmitted. During the last four transitions S1_OV remained at "1." Only when the next message is sent at the instant t4 is S1_OV reset to "0."

The values in the monitoring message indicate to the control unit 3 both that the current state of the S1 is "0" and that at least two transitions have taken place since the last monitoring message. Thus, the representation signal D1 indicating the first state of the terminal 1 can (qualitatively) reconstruct the course of the transitions as depicted in FIG. 4 at the top right, i.e. using the transitions "0" to "1," "1" to "0" and "0" to "1." This corresponds to two or three transitions of S1.

With the transmission of a message, the additional component S1_OV is reset as depicted at the instants t2 and t4 in FIG. 4. In the meantime, a transition of S2 from "0" to "1" has furthermore occurred. Thus, S2 is set to "1" and S2_OV remains at "0." With a further transition, S2 changes back from "1" to "0." Because the last transition could not be reported yet, S2_OV is now set to "1." This second value S2_OV remains "1" until S2 and S2_OV have been reported to the control unit 3 in a monitoring message at which point S2_OV is reset to "0".

Figure 5:
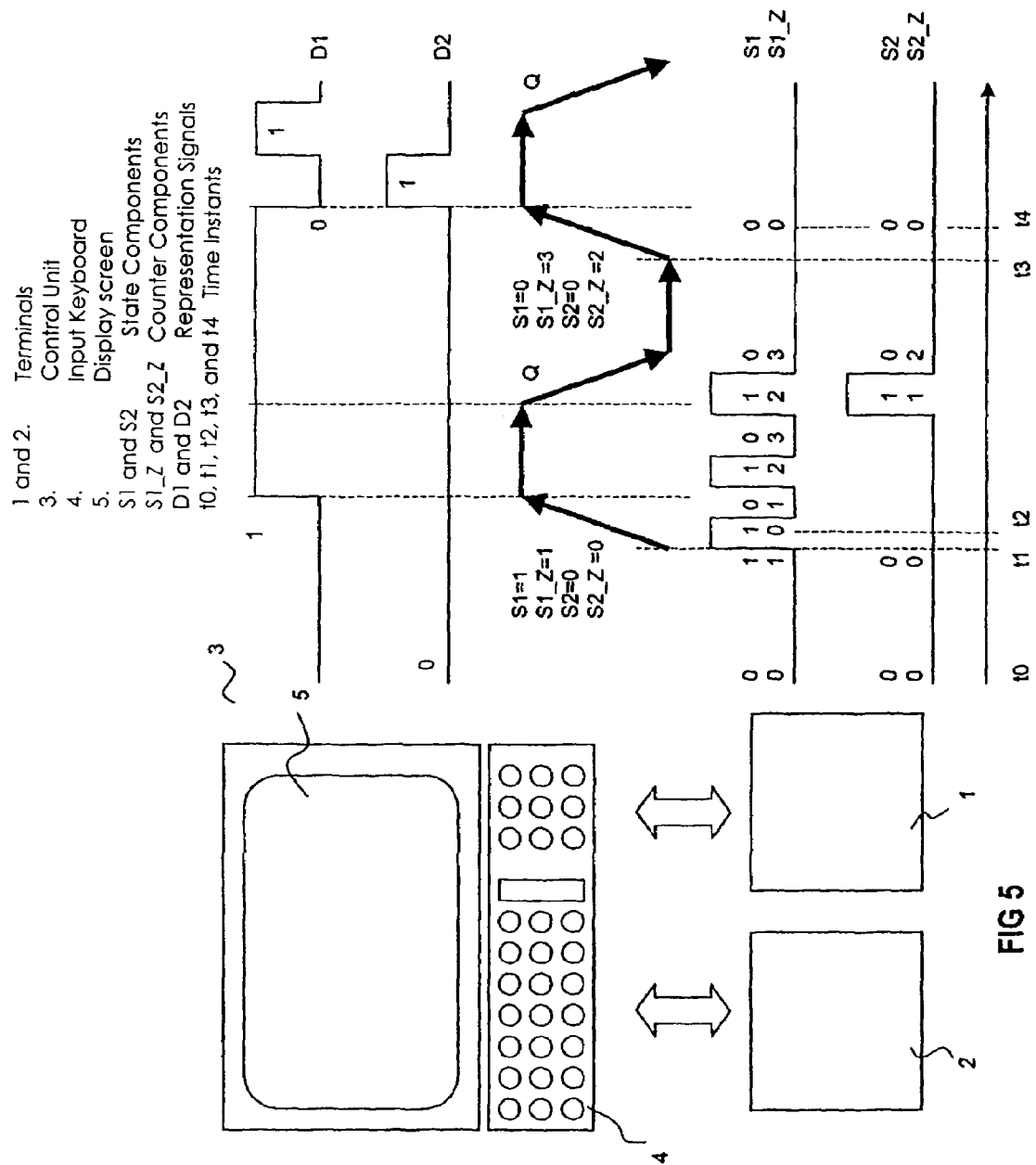
FIG. 5 shows the sequence of state changes and the associated representation for several monitoring messages and several state transitions according to a second illustrative, non-limiting embodiment of the present invention.

FIG. 5 shows a second, illustrative, non-limiting embodiment of the present invention. In this exemplary embodiment, a sequence in which the monitoring message (operational status signals or QTM method) is expanded by a counter component, which is denoted in FIG. 5 as elements S1_Z or S2_Z to distinguish these elements from the additional components in the first embodiment represented in FIG. 4 as elements S1_OV and S2_OV.

Under the general condition that the control unit 3 has stored the message state, a counter is introduced for each signal of a message with the counter components S1_Z and S2_Z. These counters counts the signal changes of state components S1 and S2 that have occurred since the last message was sent. To count signal changes that have occurred since the last message was sent, at least a 2-bit information unit is necessary for a binary signal. A 2-bit information unit will permit these counters to count from 0 to 3, a 3-bit information unit will permit these counters to count from 0 to 7 and so on.

Based on the reported signal changes or the stored message state, the control unit 3 can retrace the signal changes that have occurred in the terminals 1 and 2.

The message contains at least one counter component S1_Z or S2_Z, in addition to each state component S1 or S2, the value of which is changed when there is a transition of the state component S1 or S2. The counter component S1_Z or S2_Z forms a counter of at least four digits. This can be realized if the counter component S1_Z or S2_Z itself has four digits or if it is represented by two bits that can assume the values "00," "01," a "10" and "11."

If a state transition occurs, this fact is recorded in the corresponding counter bit S1_Z or S2_Z. (The components S1, S1_Z, S2, S2_Z . . . are listed at the bottom right of the FIG. 5.) In FIG. 5, at instant t1, a transition in state value of S1 from "0" to "1" occurs. At the same time, the counter component S1_Z is set to "1" because this is the first transition of S1. The terminal 1 transmits the message where S1 is equal to "1" and S1_Z is equal to "1" to the control unit 3 at the instant t2. Thereafter, the counter component S1_Z is reset to "0" because the control unit 3 is now aware of the last transition of S1.

At the next transition, S1 is reset from "1" to "0." Correspondingly, S1_Z is reset to "1" because the control unit 3 cannot be aware yet of this transition of the terminal unit. With the transition of S1 from "0" back to "1" S1_Z is incremented to "2" such that the state components are S1="1" and S1_Z="2." With the next transition of S1, which is from "1" to "0," the state components are thus S1="0" and S1_Z="3." Additional transitions have the result that the counter is not set to "0" with an overflow bit but counts down by "1." In other words, if a counter overflow occurs (in this particular example, overflow occurs when state component S1 has more than three transitions between the monitoring messages sent to the control unit 3), the counter counts alternately down and up. For a 2-bit information unit this is true after the third signal change. After the third signal change, if the counter is allowed to assume the value zero; the three signal changes that have occurred are then no longer identifiable for the recipient of the message. The counter is therefore decremented by one if incrementing it would cause it to assume the value zero. With the next transition, the counter is incremented again. This means that when the counter reaches the maximum displayable state it toggles between the highest and the second highest value, i.e., in the case of 2-bit counters, between the values 2 and 3. Hence, a transition that follows the fourth transition increases the counter, such that for the component S1_Z in FIG. 5 the following holds: 0, 1, 2, 3, 2, 3, 2, 3, . . . The counter component S1_Z is only reset to "0" if a monitoring message has been sent to the control unit 3, as is illustrated in FIG. 5 at an instant t4.

Based on the received signal state S1 and the counter information S1_Z, the control unit 3 can reproduce the signal shape of the last signal change. As a result, the representation signal D1 indicating the first state of the terminal 1 can (qualitatively) reconstruct the course of three out of the four transitions as shown at the top right of FIG. 5, i.e., by the transitions "0" to "1,""1" to "0" and "0" to "1." This corresponds to the transitions of S1. When a monitoring message has been sent, the counter is reset, e.g., at the instants t2 and t4 illustrated in FIG. 5.

In the meantime, a transition of S2 from "0" to "1" has also occurred between the instant t2 and the instant t3. As a result, S2 is set to "1" and S2_Z is set to "1." With a further transition, S2 changes from "1" back to "0." S2_Z is now incremented from "1" to "2." Incrementing of the second value S2_Z is continued (and alternated with decrementing once the maximum value has been reached) until S2 and S2_Z have been reported to the control unit 3 in a monitoring message.

The present invention is not limited to the examples given above. It has been assumed, for instance, that all the components S1, S2, S1_OV, S2_OV, S1_Z, S2_Z of the monitoring message are represented in binary form. This is not necessary, however. Some or all of the components can also be present as analog values or some other value.

The above description of illustrative, non-limiting embodiments has been given by way of an example. The above and other features of the invention including various novel method steps and a system of the various novel components have been particularly described with reference to the accompanying drawings and pointed out in the claims. It will be understood that the particular process and construction of parts embodying the invention is shown by way of illustration only and not as a limitation of the invention. The principles and features of this invention may be employed in varied and numerous embodiments without departing from the scope of the invention as defined by the appended claims and equivalents thereof.

What is claimed is:

1. A method for monitoring and determining preceding states of at least one terminal of an automation system, comprising:
   at least one terminal configured to assume at least two states and to output a monitoring message in accordance with the at least two states; and
   a control unit configured to read in the monitoring message from the at least one terminal, said method comprising:
   outputting a subsequent monitoring message from the at least one terminal only after the at least one terminal has received an acknowledgment message from the control unit, wherein the monitoring message comprises a state component, and at least one additional component;
   changing a value of the at least one additional component when a transition of a state of the at least one terminal occurs; and
   resetting the at least one additional component to an initial value when a monitoring message is output to the control unit.

2. The method as claimed in claim 1, wherein the at least one additional component forms a counter of at least four values.

3. The method as claimed in claim 2, wherein the monitoring message further comprises at least one state component with the value corresponding to a state of the at least one terminal, and the value of the at least one additional component is changed if the state changes more than twice before the terminal outputs the monitoring message.

4. The method as claimed in claim 3, wherein all of the components and the additional components of the monitoring message are represented in a binary form.

5. The method as claimed in claim 2, wherein all of the components and the additional components of the monitoring message are represented in a binary form.

6. The method as claimed in claim 1, wherein the at least one additional component forms a counter, and wherein after the counter reaches a maximum value, the counter alternately counts down and counts up by one.

7. The method as claimed in claim 6, wherein the monitoring message further comprises at least one state component with the value corresponding to a state of the at least one terminal, and the value of the at least one additional component is changed if the state changes more than twice before the terminal outputs the monitoring message.

8. The method as claimed in claim 7, wherein all of the components and the additional components of the monitoring message are represented in a binary form.

9. The method as claimed in claim 6, wherein all of the components and the additional components of the monitoring message are represented in a binary form.

10. The method as claimed in claim 1, wherein the monitoring message further comprises at least one state component with a value corresponding to a state of the at least one terminal, and the value of the at least one additional component is changed if the state changes more than twice before the terminal outputs the monitoring message.

11. The method as claimed in claim 10, wherein all of the components and the additional components of the monitoring message are represented in a binary form.

12. The method as claimed in claim 1, wherein all of the components and the additional components of the monitoring message are represented in a binary form.

13. The method as claimed in claim 1, wherein the at least one additional component forms a counter of at least two bits.

14. The method as claimed in claim 13, wherein after the counter reaches a maximum value, the counter alternately decrements and increment a least significant bit.

15. A system for monitoring and determining preceding states of at least one terminal of an automation system, the system comprising:
   at least one terminal, the at least one terminal assumes at least two states and outputs a monitoring message comprising a state component and at least one additional component, a value of the state component and a value of the at least one additional component depend on the at least two states of the at least one terminal; and a control unit reading in the monitoring message from the at least one terminal, wherein the at least one terminal outputs a subsequent monitoring message only after receiving an acknowledgment message from the control unit, wherein the value of the at least one additional component changes when a transition of a state of the at least one terminal occurs and a previous transition of a state of the at least one terminal is buffered in the state component, and wherein the at least one additional component is reset to an initial value when a monitoring message is output to the control unit.

16. A system for monitoring and determining preceding states of at least one terminal of an automation system, the system comprising:

at least one terminal, the at least one terminal assumes at least two states and outputs a monitoring message comprising a state component and at least one additional component, a value of the state component and a value of the at least one additional component depend on the at least two states of the at least one terminal; and a control unit reading in the monitoring message from the at least one terminal, wherein the at least one terminal outputs a subsequent monitoring message only after receiving an acknowledgment message from the control unit, wherein the at least one additional component is a counter of at least four digits, the value of the counter is incremented when a transition of a state of the at least one terminal occurs, and wherein the counter is reset to an initial state when a monitoring message is output to the control unit.

17. The system as claimed in claim 16, wherein after the counter reaches a maximum value, the counter alternately counts down and up by one.

18. A method for monitoring and determining preceding states of at least one terminal of an automation system, the method comprising:

outputting a monitoring message by a terminal, depending on a state of the terminal, the terminal is configured to assume at least two states and the monitoring message comprising a state component and at least one additional component;

reading in the monitoring message from the terminal by the control unit;

sending an acknowledgment message by the control unit to the terminal, the acknowledgement message acknowledges the reading in of the monitoring message;

receiving the acknowledgement message by the terminal; and after receiving the acknowledgement message, outputting by the terminal a subsequent monitoring message, wherein a value of the at least one additional component changes when a transition of the state of the terminal occurs, and wherein the at least one additional component is reset to an initial value when the subsequent monitoring message is output to the control unit.

* * * * *